United States Patent [19]
Halonen et al.

[11] Patent Number: 4,543,026
[45] Date of Patent: Sep. 24, 1985

[54] PICK-UP MEANS FOR ROLLER PALLETS

[75] Inventors: Heino Halonen, Hyvinkää; Kalevi Hetemaa; Frans Vainio, both of Helsinki, all of Finland

[73] Assignee: Elevator GmbH, Baar, Switzerland

[21] Appl. No.: 445,506

[22] Filed: Nov. 30, 1982

[30] Foreign Application Priority Data

Nov. 30, 1981 [FI] Finland ................................ 813833

[51] Int. Cl.⁴ ................................................ B60P 1/64
[52] U.S. Cl. ...................................... 414/352; 104/48; 104/252; 414/499
[58] Field of Search ............... 414/276, 280, 286, 343, 414/345, 349, 352, 389, 572, 353; 104/48, 250, 252

[56] References Cited
U.S. PATENT DOCUMENTS 3,435,969  4/1969  McCartney et al. ............ 414/343 X
3,805,974  4/1974  Andersson et al. ............... 414/276
4,010,855  3/1977  Smith ................................ 414/280
4,197,047  4/1980  Haldimann ..................... 414/276

Primary Examiner—Robert G. Sheridan
Attorney, Agent, or Firm—Martin Smolowitz

[57] ABSTRACT

A pick-up means for roller pallets in such applications where the roller pallets (1) run on rails (2) on tracks (3). At the discharge end of the tracks there is a stop (4) preventing the discharge of roller pallets until a pick-up means (6) provided with a travelling surface (5) comes to get the roller pallets meant to be dispatched. The pick-up means of the invention is characterized in that it comprises a slide (8) movable in its longitudinal direction and provided with a transporter (7), said slide being at a pick-up operation movable in under the first roller pallet (1) on the rails (2), while at the same time it will disengage the stop (4) so that the roller pallet moves onto the travelling surface (5) of the pick-up means, being pulled by the slide (8). The pick-up operation is now accomplished with considerably greater safety and speed than with any apparatus of prior art.

8 Claims, 7 Drawing Figures

PICK-UP MEANS FOR ROLLER PALLETS

The present invention concerns a pick-up means for roller pallets in such applications where the roller pallets run on rails having at their discharge end a stop preventing the discharge of roller pallets until the pick-up means, provided with a travelling surface, comes to get the roller pallets destined to be shipped. Roller pallets are understood to be load pallets provided with wheels, and which may be provided with walls and roof.

The inconvenience encumbering pick up means for the roller pallets of prior art is that when the roller pallet moves from the rail track to the pick-up means it must be lifted over the stop, whereby the entire load is tilted against the load behind it, involving the risk that the loads or the frames of the roller pallets, are damaged. In prior art turnable stops are also known, which require a turning mechanism with controls.

SUMMARY OF INVENTION

The pick-up means of the present invention is characterized in that the pick-up means comprises a slide movable in its longitudinal direction and provided with a transporter, this slide being movable in the pick-up operation in under the first roller pallet standing on the track, while at the same time it disengages the stop so that the roller pallet moves from the track over onto the travelling surface of the pick-up means, pulled by the slide. By the aid of the invention, the roller pallets can be transferred from the track onto the pick-up means directly without any tilting and without stop actuating means. Therefore the picking up of roller pallets becomes considerably more positive and faster.

An advantageous embodiment of the invention is characterized in that at the pick-up end of the slide, adjacent to the transporter, there has been provided a downwardly directed guiding slot which disengages the stop as the slide moves in under the roller pallet. Hereby is accomplished highly reliable control of the stop, since its disengaging takes place with positive enforcement as the slide enters under the roller pallet.

Another embodiment of the invention is characterized in that under the roller pallet there are two downwardly pointing engagement lists, transversal to the direction of travel, for the roller pallet transporting mechanism known in itself in the art. These engagement lists may be so disposed that the foremost engagement list has a greater width in the direction of travel of the roller pallet than the rearmost engagement list. Thus the functioning of the stop may be arranged to be such that it only engages with the list of greater width, that is the foremost engagement list, whereby the rearmost engagement list can pass the stop without hindrance. The roller pallet transporting mechanism may be so disposed that its transporting members engage with either both engagement lists, or only the rearmost narrower engagement list.

One embodiment of the invention is further characterized in that the transporting of the pick-up means, the functions of the slide and transporter, in other words the pickings up of given roller pallets and their quantities are controllable by means of a control system connected to the apparatus. It is thus possible to make continuous the functions of the pick-up means, in particular the picking up of several roller pallets, and no interruptions can occur in the pick-up activity.

DESCRIPTION OF INVENTION

The invention is described in the following with the aid of an example and with reference to the drawings attached, wherein FIGS. 1–5 illustrate the steps of picking up of one roller pallet from a set of shelves onto a pick-up means.

Figure 1:
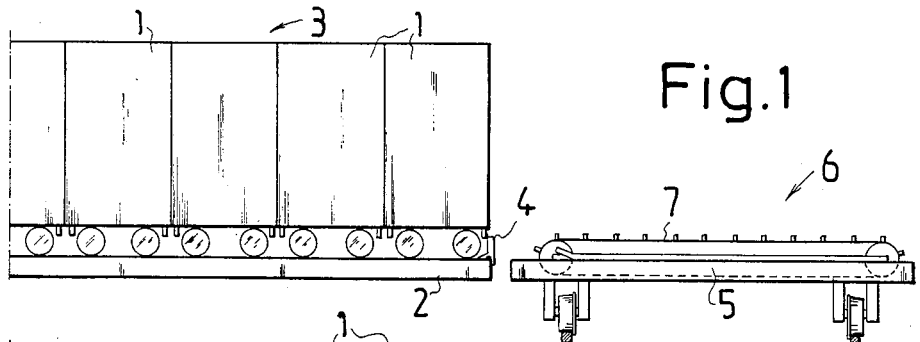
Figure 2:
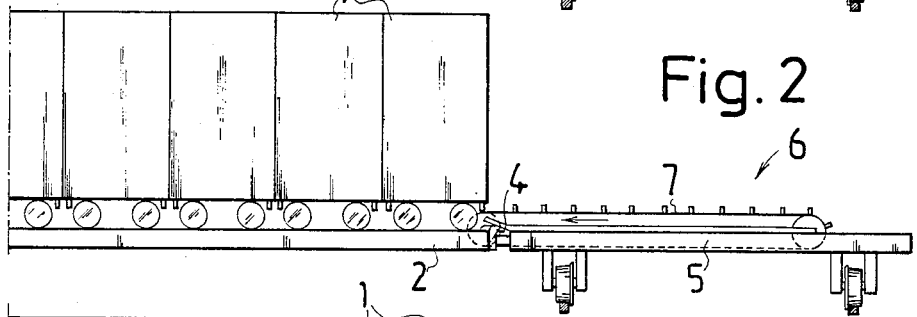
Figure 3:
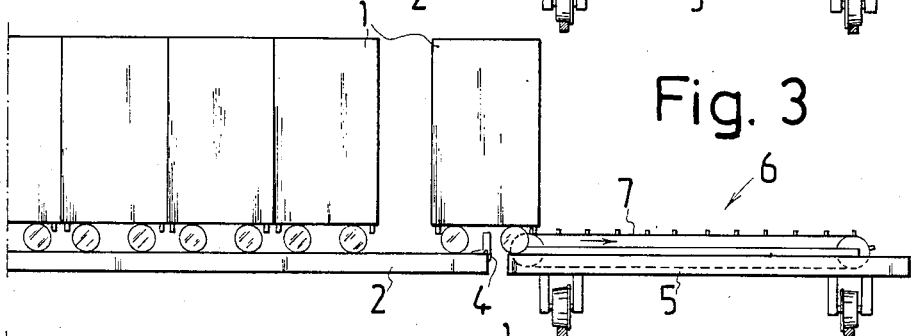
Figure 4:
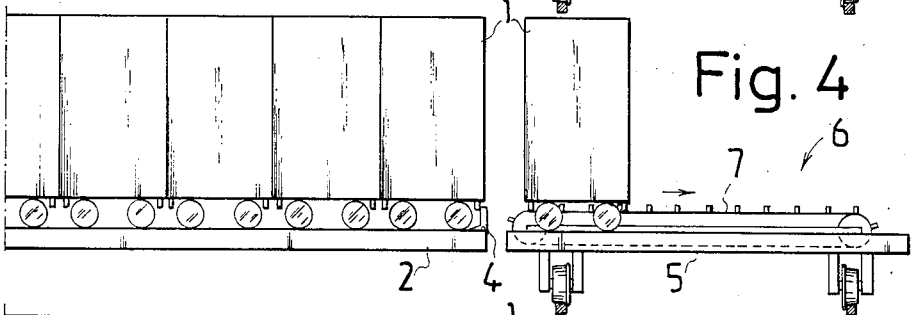
Figure 5:
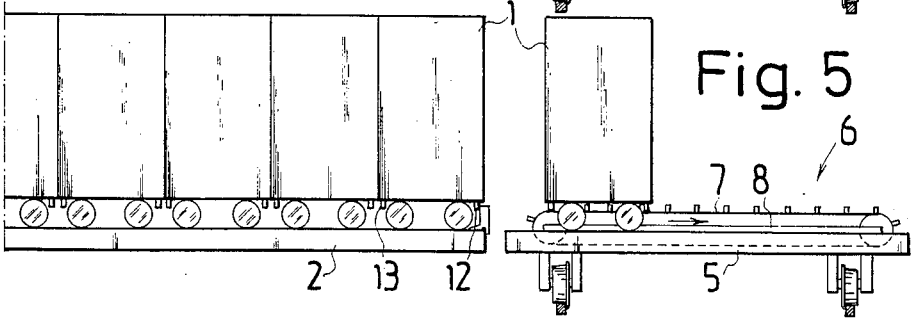
Figure 6:
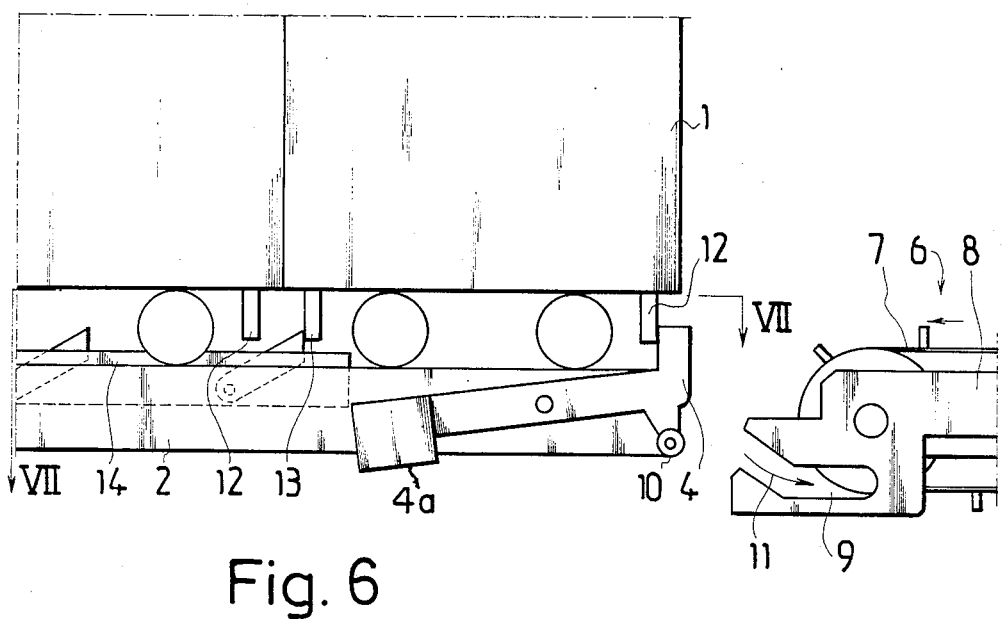
FIG. 6 shows a roller pallet on rails including a pick-up means and illustrates the operation of the pallet stop.
Figure 7:
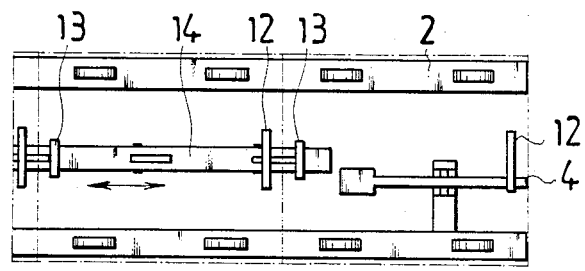
FIG. 7 shows the sectional view taken along the line VII—VII in FIG. 6.

The roller pallets 1 run on dual rails 2 on the track 3, having at their discharge end a stop 4 pivotably attached to one of the rails 2 and counterweighted at 4a, which prevents the discharging of the roller pallets until the pick-up means 6 provided with travelling surface 5 comes to fetch the roller pallets intended to be shipped. The pick-up means 6 carries a slide 8 provided with a transporter 7 and movable in the slide's longitudinal direction, and which in the pallet pick-up operation can be moved in under the first roller pallet standing on the rails 2, while at the same time it disengages the stop 4 so that the roller pallet 1 will come onto the travelling surface 5 of the foremost pick-up means, pulled by the slide 8. On the pick-up end of the slide 8, adjacent to the transporter 7, has been provided a downwardly pointing guide slot 9, which disengages the counterweighted pivotable stop 4 as the slide 8 moves in under the roller pallet. The roller 10 on the pivotable stop 4 moves downwardly into guide slot 9, as indicated by the arrow 11, whereby the stop is disengaged.

Under the roller pallet 1 have been provided two downwardly pointing engagement lists 12,13 located transversal to the direction of travel for the roller pallets, one of lists 12 for the stop 4 and the other list 13 for the transporting mechanism 14, known in itself in the art, pushing the roller pallets forward. As viewed in the direction of propagation of the roller pallet 1, the foremost engagement list 12 has greater width than the rearmost engagement list 13. The foremost, i.e., broader engagement list 12 will therefore engage with the stop 4, and the rearmost engagement list is allowed freely to move past the stop. The transporting of the pick-up means 6, the functions of the slide 8 and of the transporter 7 are controllable by the aid of a computer connected to the apparatus, whereby all functions take place rapidly and reliably, without interruptions. On the pick-up means 6 a plurality of roller pallets can be taken up, from one site or from different sites.

It is obvious to a person skilled in the art that different embodiments of the invention may vary within the scope of the claims stated below.

We claim:

1. A pick-up means for roller pallets which run on rails and having at their discharge end a stop means which prevents discharging a roller pallet until engaged by a pick-up means provided with a travelling surface comes to get the roller pallet, wherein the improvement comprises that the stop means is pivotably attached to one of the rails, and the pick-up means includes a slide movable in its longitudinal direction and provided with a transporter, said slide having a downwardly directed guide slot located at its forward end adjacent the transporter, means on said stop means for engagement with the downwardly directed guide slot, the slide being movable in under the roller pallet standing first on the rails, while at the same time the downwardly directed guide slot disengages the pivotable stop, so that the roller pallet can be moved onto the travelling surface of the pick-up means without any tilting while being pulled by the transporter on the slide.

2. A pick-up means for roller pallets according to claim 1, wherein under the roller pallet there are two downwardly pointing engagement lists each located transversal to the direction of travel for a roller pallet transporting mechanism, the foremost of said two engagement lists with reference to the direction of travel of the roller pallet being contacted by said stop means.

3. A pick-up means for roller pallets according to claim 2, wherein the foremost engagement list with reference to the direction of travel of the roller pallet has greater width than the rearmost engagement list.

4. A pick-up means for roller pallets according to claim 2, wherein the foremost of said two engagement lists has width greater than the rearmost engagement list and engages with said stop means, and the rearmost list engages with a pallet transporting mechanism located below the pallet and can move past the stop means.

5. A pick-up means according to claim 1, wherein the transporting of the pick-up means, the functions of the slide and of the transporter including operations of picking up, the roller pallets and their quantities are controllable by the aid of a computer operated control system functionally connected to the apparatus.

6. A pick-up means for roller pallets according to claim 1, wherein said downwardly directed guide slot is located on the foremost pick-up end of said slide and disengages the pivotable stop means as the slide is moved in under the first roller pallet, and reengages the pivotable stop means as the slide is moved back away from the roller pallet rails.

7. A pick-up means for roller pallets according to claim 1, wherein said pivotable stop means has a counterweight and roller attached thereto, the roller being contacted by said guide slot to disengage the stop means.

8. A pick-up means for roller pallets which run on rails, comprising:
   (a) dual rails adapted for supporting multiple roller pallets thereon;
   (b) a stop means located at the pallet discharge end of one of said rails, said stop means being pivotably attached to the rail and counterweighted so as to contact a downwardly pointing engagement list on the pallet to control discharge of the roller pallets from said rails;
   (c) a pick-up means provided with a travelling surface for carrying the roller pallets which are picked up from the rails; and
   (d) a slide means carried by said pick-up means and movable in its longitudinal direction and in under the roller pallet standing first on said rails, said slide means having a transporter mounted thereon and a downwardly directed guide slot adjacent said transporter, means on said stop means for engagement with the downwardly directed guide slot, whereby the slide is movable under the first roller pallet so as to disengage the stop means and pick up the first pallet from the rails by the transporter onto the travelling surface of the pick-up means.

* * * * *